(12) United States Patent
Felt et al.

(10) Patent No.: US 10,394,439 B2
(45) Date of Patent: Aug. 27, 2019

(54) MANAGING USER INTERFACE ELEMENTS USING GESTURES

(71) Applicant: Cellco Partnership, Basking Ridge, NJ (US)

(72) Inventors: Michelle Felt, Randolph, NJ (US); Sankar Shanmugam, Dayton, NJ (US); John Van-Ryzin, Madison, NJ (US); Siva Sivaganesh, Belle Mead, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 196 days.

(21) Appl. No.: 15/219,477

(22) Filed: Jul. 26, 2016

(65) Prior Publication Data

US 2016/0334958 A1 Nov. 17, 2016

Related U.S. Application Data

(62) Division of application No. 14/096,696, filed on Dec. 4, 2013, now Pat. No. 9,423,927.

(51) Int. Cl.
| | | |
|---|---|---|
| *G06F 3/0486* | (2013.01) | |
| *G06F 3/0482* | (2013.01) | |
| *G06F 3/0488* | (2013.01) | |
| *G06F 3/0481* | (2013.01) | |

(52) U.S. Cl.
CPC .......... *G06F 3/0486* (2013.01); *G06F 3/0482* (2013.01); *G06F 3/04817* (2013.01); *G06F 3/04883* (2013.01)

(58) Field of Classification Search
CPC ... G06F 3/0488; G06F 3/04842; G06F 3/0482
See application file for complete search history.

(56) References Cited

U.S. PATENT DOCUMENTS

| | | | | |
|---|---|---|---|---|
| 2006/0036568 | A1* | 2/2006 | Moore | G06F 17/30126 |
| 2008/0205789 | A1* | 8/2008 | Ten Kate | G06F 17/30265 |
| | | | | 382/284 |
| 2008/0282202 | A1* | 11/2008 | Sunday | G06F 3/0483 |
| | | | | 715/863 |
| 2009/0138830 | A1* | 5/2009 | Borgaonkar | G06F 3/04883 |
| | | | | 715/863 |
| 2009/0204925 | A1* | 8/2009 | Bhat | G06F 1/1626 |
| | | | | 715/778 |
| 2009/0307623 | A1* | 12/2009 | Agarawala | G06F 3/04815 |
| | | | | 715/765 |
| 2010/0099456 | A1* | 4/2010 | Kim | G06F 3/0346 |
| | | | | 455/556.1 |
| 2011/0055773 | A1* | 3/2011 | Agarawala | G06F 3/016 |
| | | | | 715/863 |
| 2011/0163971 | A1* | 7/2011 | Wagner | G06F 3/04817 |
| | | | | 345/173 |

(Continued)

*Primary Examiner* — Anil K Bhargava

(57) ABSTRACT

Systems and methods for managing user interface elements using gestures are disclosed. In some implementations, a block representing a plurality of user interface elements is displayed on a touch screen of a device. A first gesture is initiated at a position corresponding to the block representing the plurality of the user interface elements is received via the touch screen. A first path corresponding to the first gesture is stored in a memory. At least a portion of the plurality of user interface elements are displayed on the touch screen in positions along the first path.

19 Claims, 14 Drawing Sheets

(56) References Cited

U.S. PATENT DOCUMENTS

| | | | |
|---|---|---|---|
| 2011/0209093 A1* | 8/2011 | Hinckley | G06F 3/04817 715/834 |
| 2012/0026113 A1* | 2/2012 | Kasahara | G06F 3/0482 345/173 |
| 2012/0180001 A1* | 7/2012 | Griffin | G06F 3/04883 715/863 |
| 2012/0192108 A1* | 7/2012 | Kolb | G06F 3/0482 715/810 |
| 2013/0009990 A1* | 1/2013 | Hsu | G06F 3/0488 345/629 |
| 2013/0235074 A1* | 9/2013 | Cherna | G06T 11/60 345/619 |
| 2014/0137046 A1* | 5/2014 | Matas | G06F 3/04883 715/838 |
| 2014/0344765 A1* | 11/2014 | Hicks | G06F 3/04883 715/863 |

* cited by examiner

MANAGING USER INTERFACE ELEMENTS USING GESTURES

CROSS-REFERENCES TO RELATED APPLICATIONS

This application is a divisional of U.S. application Ser. No. 14/096,696, entitled "MANAGING USER INTERFACE ELEMENTS USING GESTURES", filed on Dec. 4, 2013, the entirety of which is incorporated by reference herein.

BACKGROUND

A mobile device may be used to display multiple user interface elements on a small screen. The user interface elements may include multiple photographs in a photo album and/or multiple videos in a video collection. Due to the limited amount of space on the small screen, a user may have difficulty reviewing, accessing or modifying (e.g., changing an order, deleting, etc.) these user interface elements. Currently all photos are managed and viewed by tile view or 3D wall view. The tile view has been in use for some time and has become a monotonous experience. Even the recently introduced 3D wall view has lost its favor with the users as it restricts the users' freedom in sorting their photo and/or video albums. As the foregoing illustrates, a new approach is needed to allow the user to explore and manage their photos and videos on a touch screen of a device.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
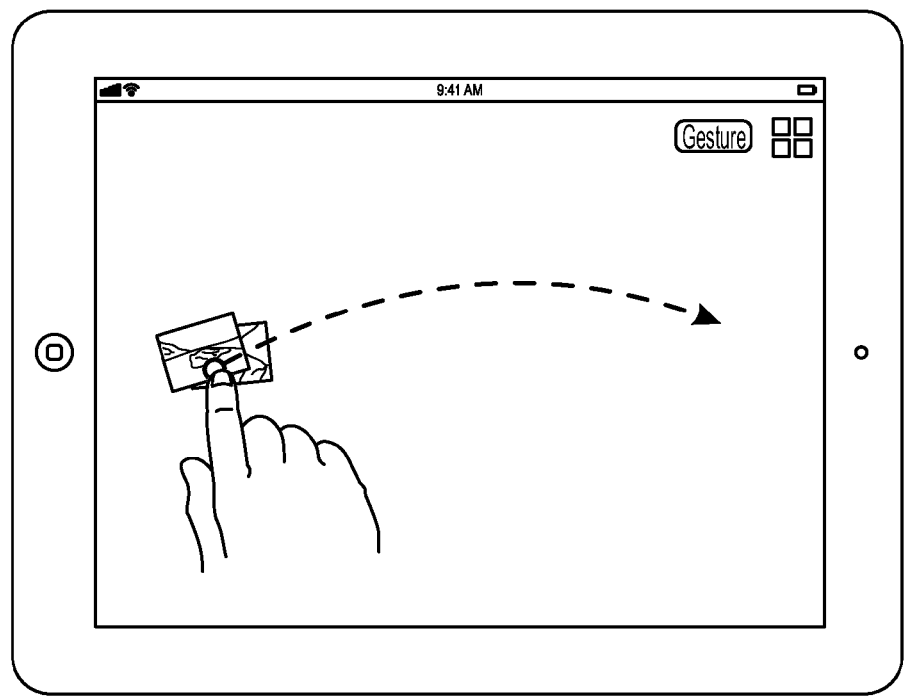
FIGS. 1A-1Q illustrates exemplary interfaces for displaying user interface elements.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for exploring and managing a plurality of user interface elements, which may be displayed via a touch screen of a computing device. The plurality of user interface elements can be displayed based on gestures of the user's fingers. The user interface elements may be displayed by fanning out or spreading out evenly or with different density by speed of the gesture. Also, the user interface elements may be closed and folded back easily using finger gestures. As such, the users can easily sort the user interface elements at their own speed.

The plurality of user interface elements may be collapsed on top of each other during the initial rendering on the touch screen of the computing device. The plurality of user interface elements may include photographs. Alternatively or additionally, the plurality of user interface elements may include videos, audio files, icons for accessing applications, email messages, text messages, word processing documents, spreadsheets, slide shows, etc. The computing device may receive, via the touch screen, a first gesture initiated at a position corresponding to the plurality of user interface elements. The path corresponding to the first gesture may be stored in the memory of the computing device and may be used to spread out the plurality of user interface elements across the display, thereby changing the view of the plurality of user interface elements from the initial collapsed view to a spread out view along the path.

Some aspects of the subject technology relate to searching of photographs using facial recognition technology, for example, Face Tag® developed by Facebook@ Inc. of Menlo Park, Calif. If a user wishes to display the photos of a particular person, the subject technology may facilitate advanced searching by name, using face recognition. The user may sort the photos by name and to display or remove the particular category. For instance, Susan, a user of a computing device, broke up with Tom, and she wishes to remove all of Tom's pictures from a digital photo album on the computing device. Using facial recognition, Susan may identify all the pictures with Tom and delete them. In some examples, with appropriate permissions from the user, the subject technology may access the user's account with a social networking service (e.g., Facebook® or Google Plus®) to recognize and identify people in the photos stored on the computing device.

These features of organizing photos will be futuristic and will save a lot of time and effort for the user making it an enjoyable experience.

Figure 1B:
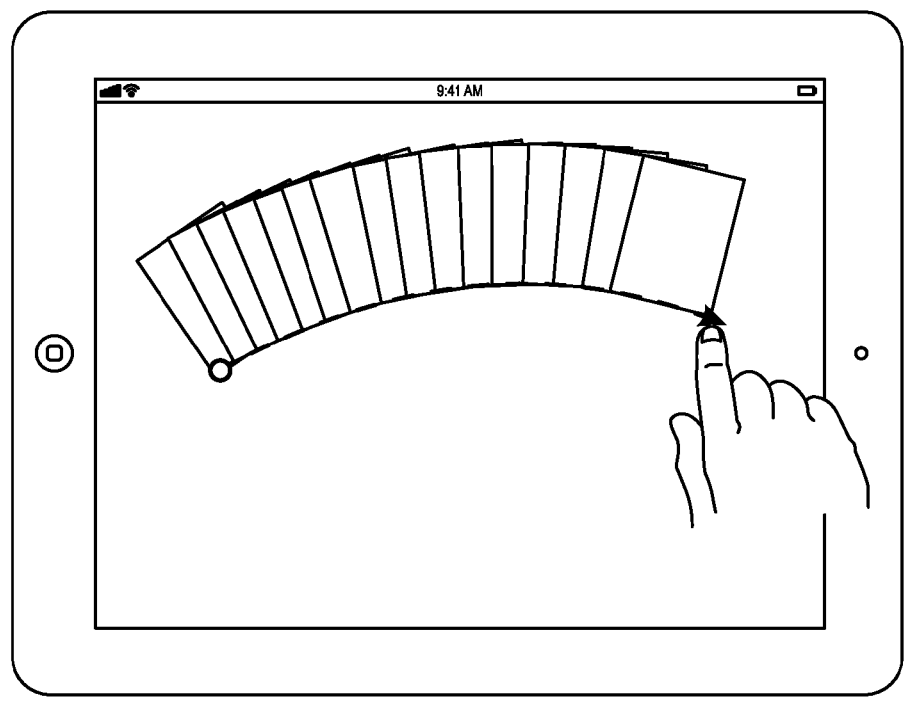
Figure 1C:
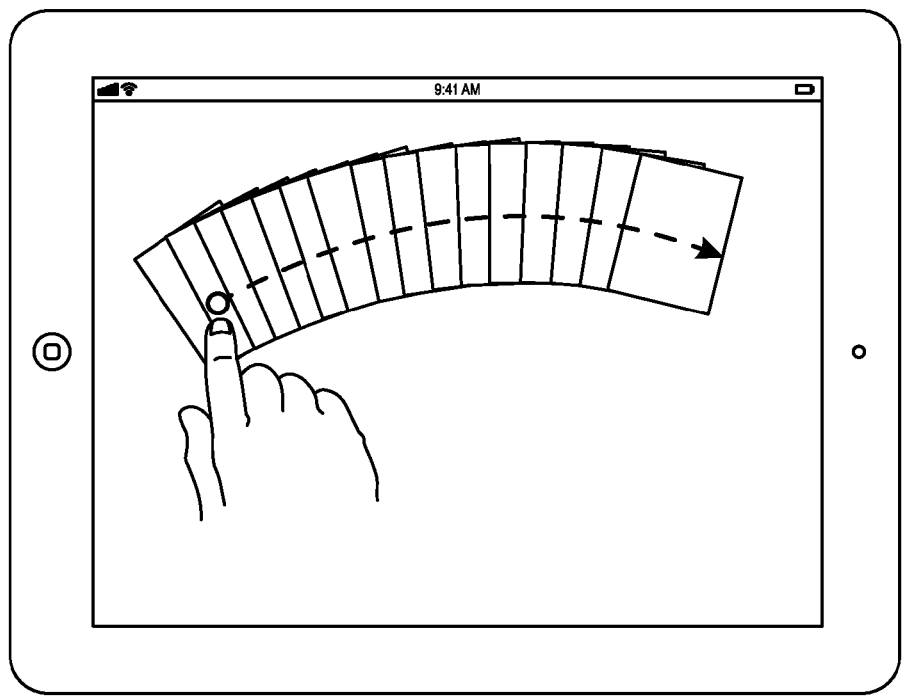
Figure 1D:
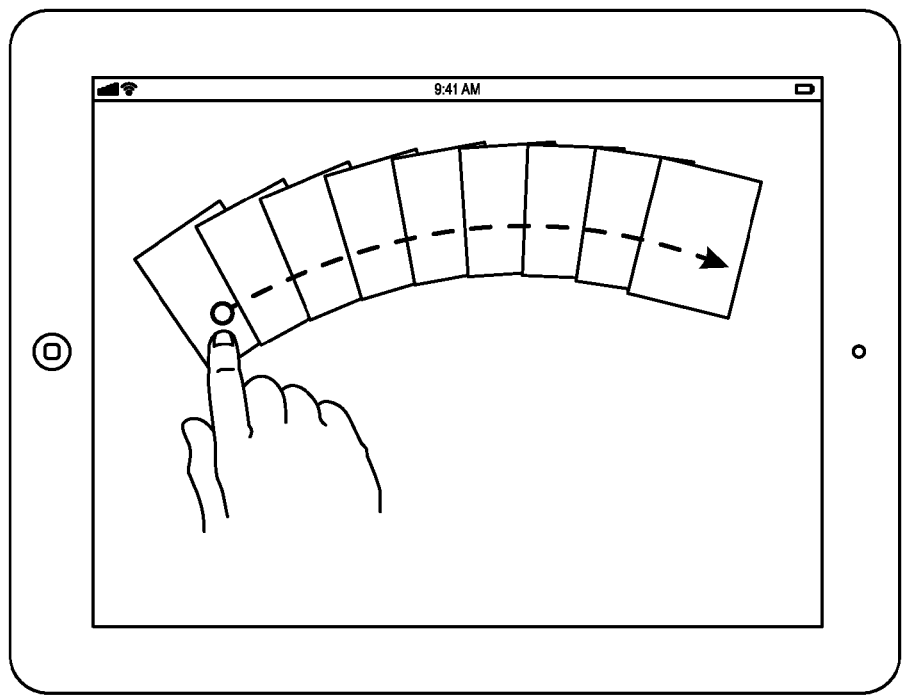
Figure 1E:
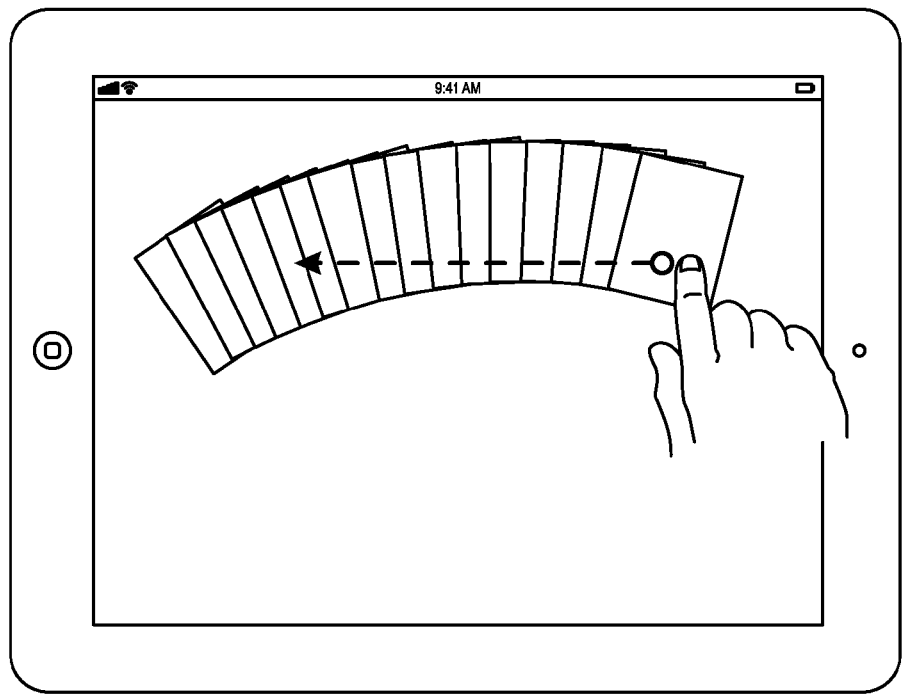
Figure 1F:
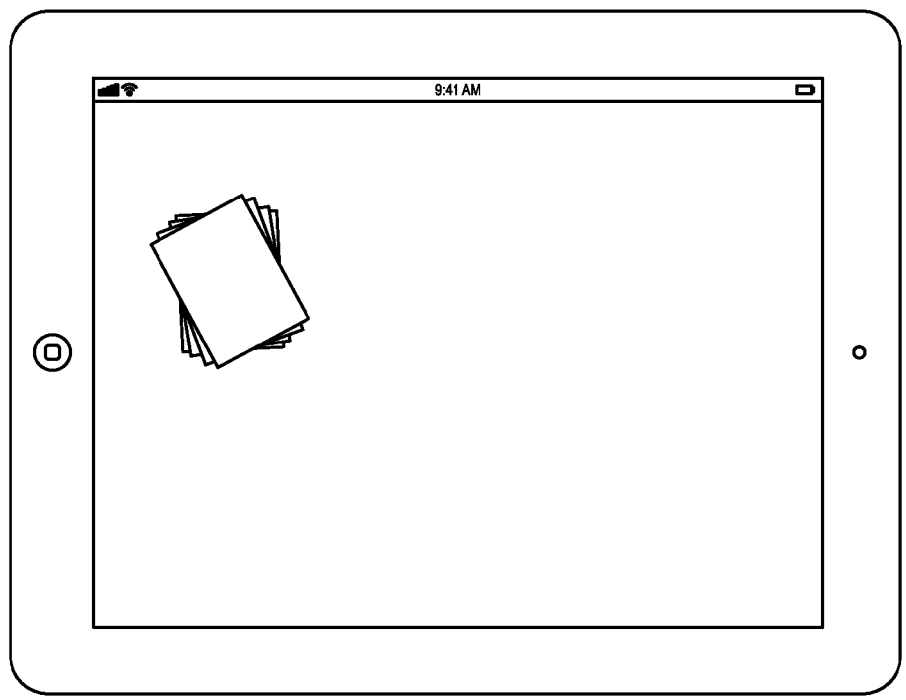
Figure 1G:
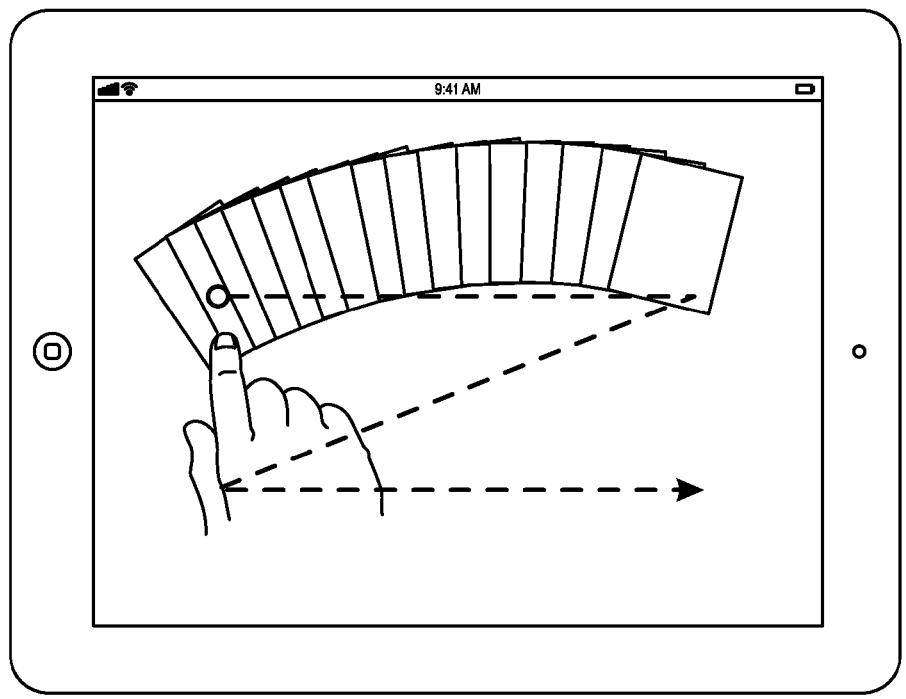
Figure 1H:
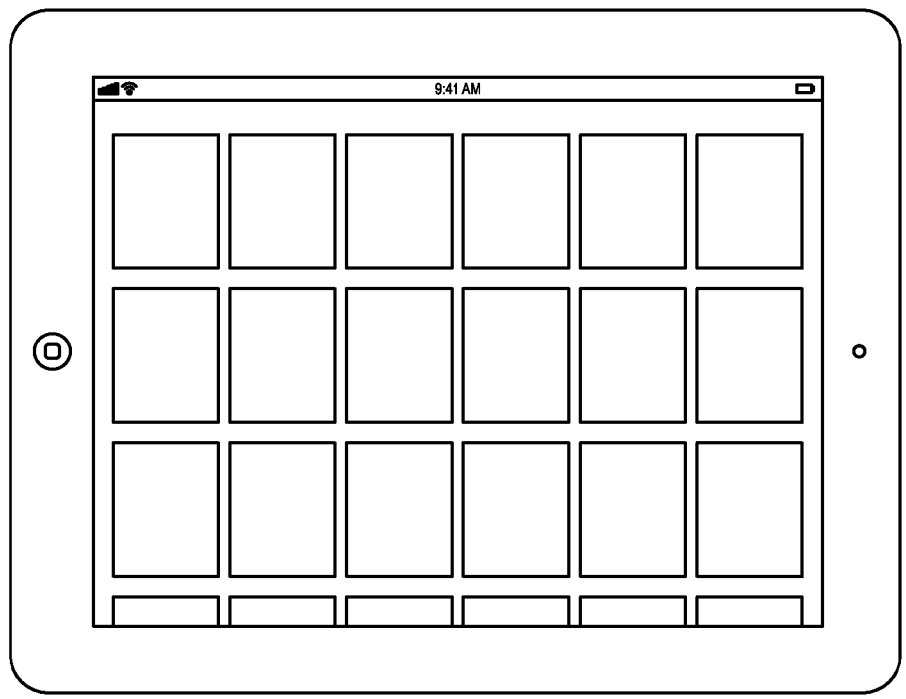
Figures 1, 1J:
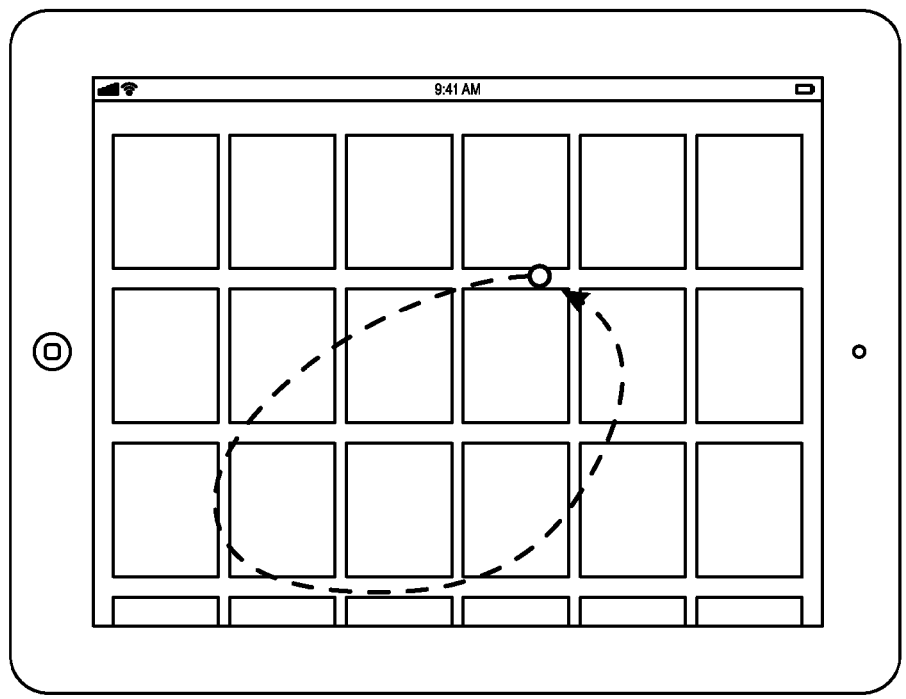
Figures 1, 1J, 2:
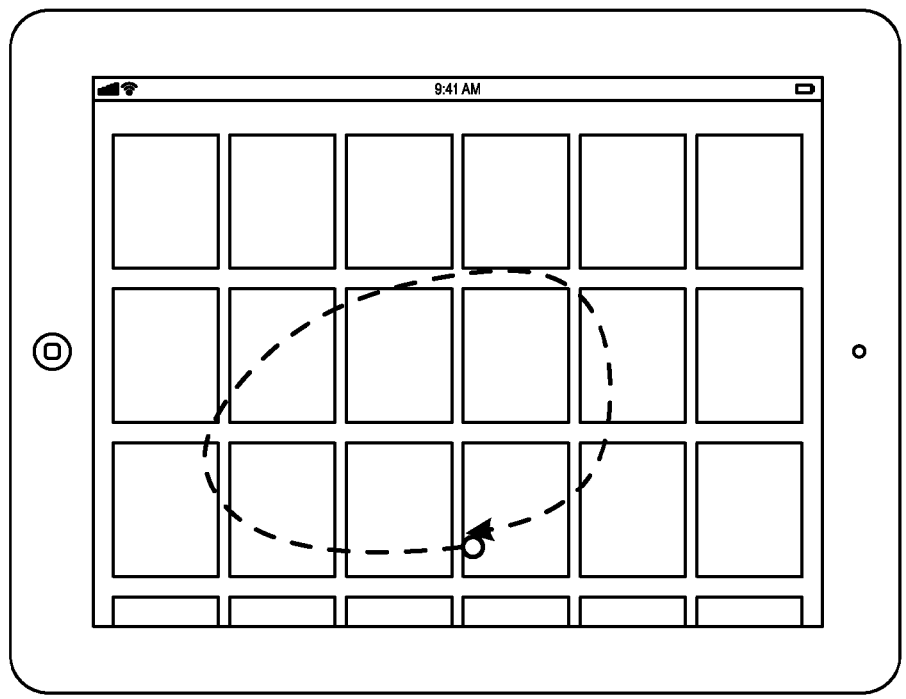
FIG. 2 illustrates an exemplary computing device for displaying user interface elements.
Figure 1K:
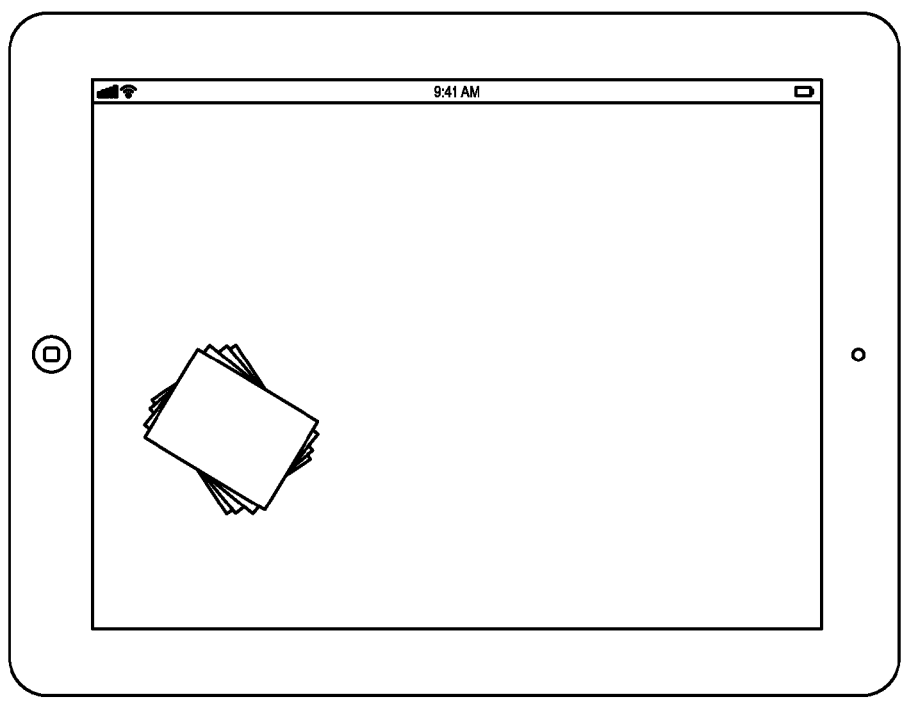
Figures 1, 1L:
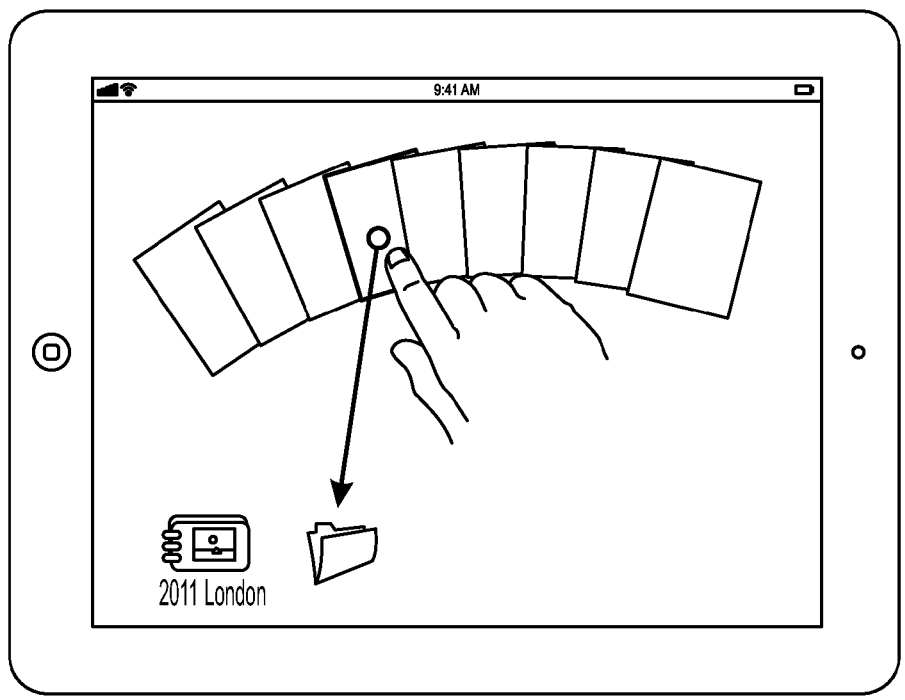
Figures 1, 1L, 2:
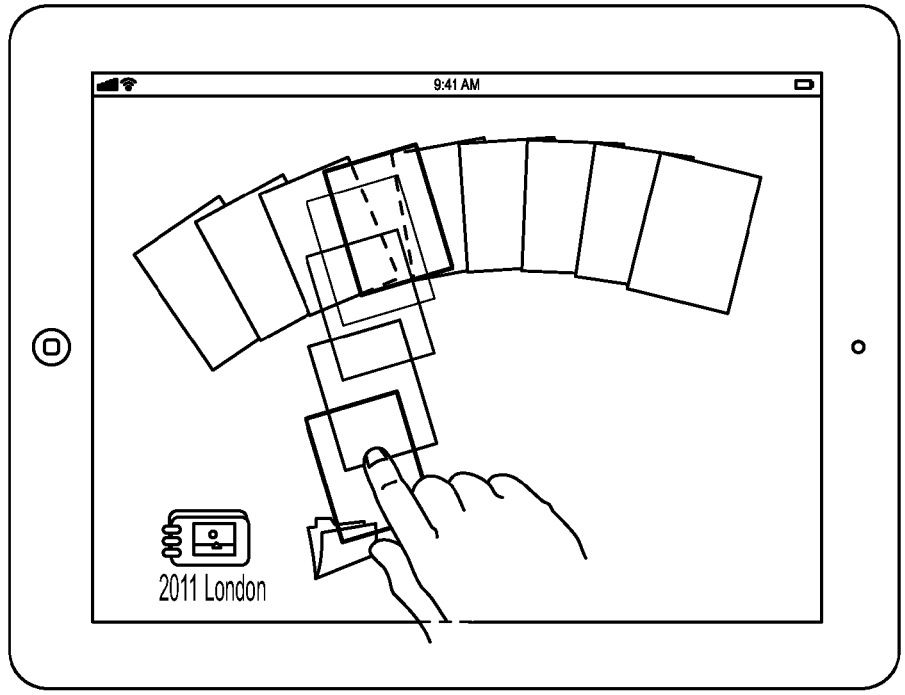
Figure 1M:
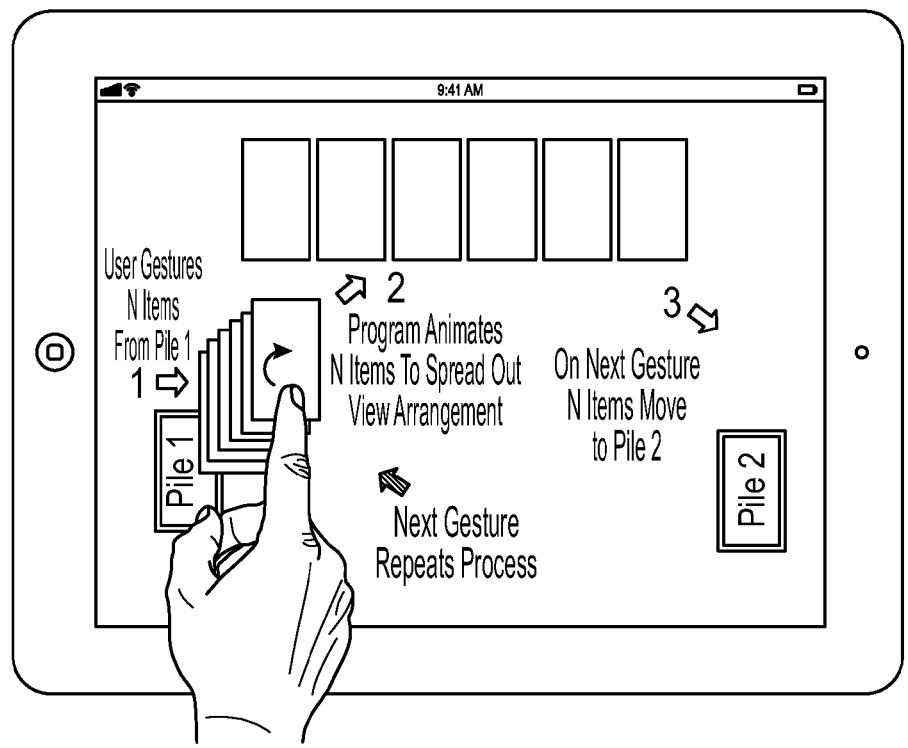
Figure 1N:
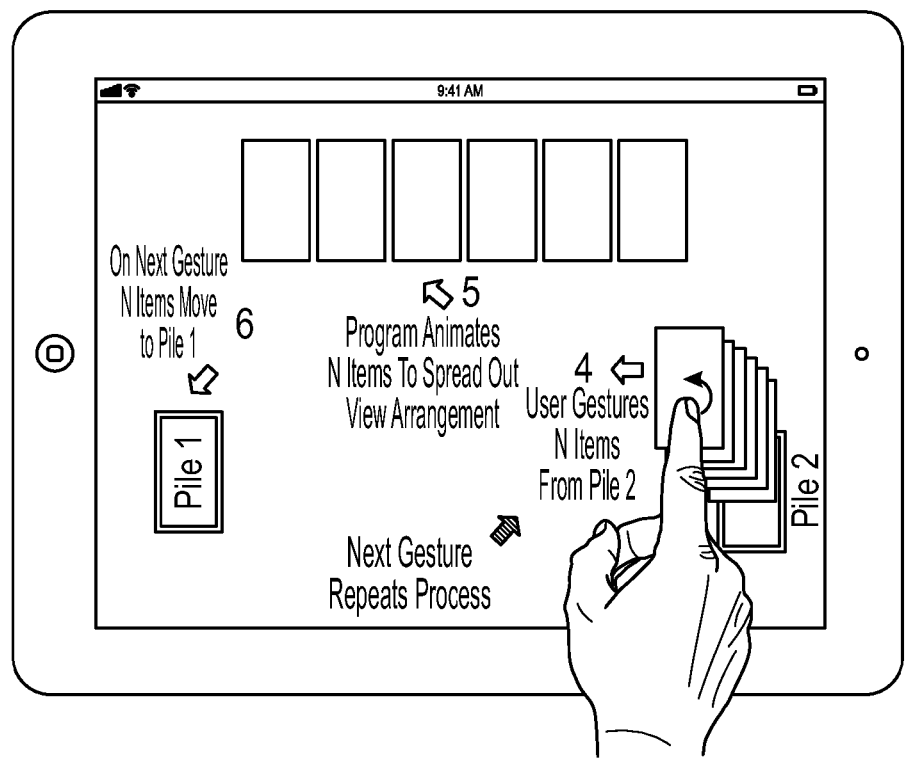
Figure 1P:
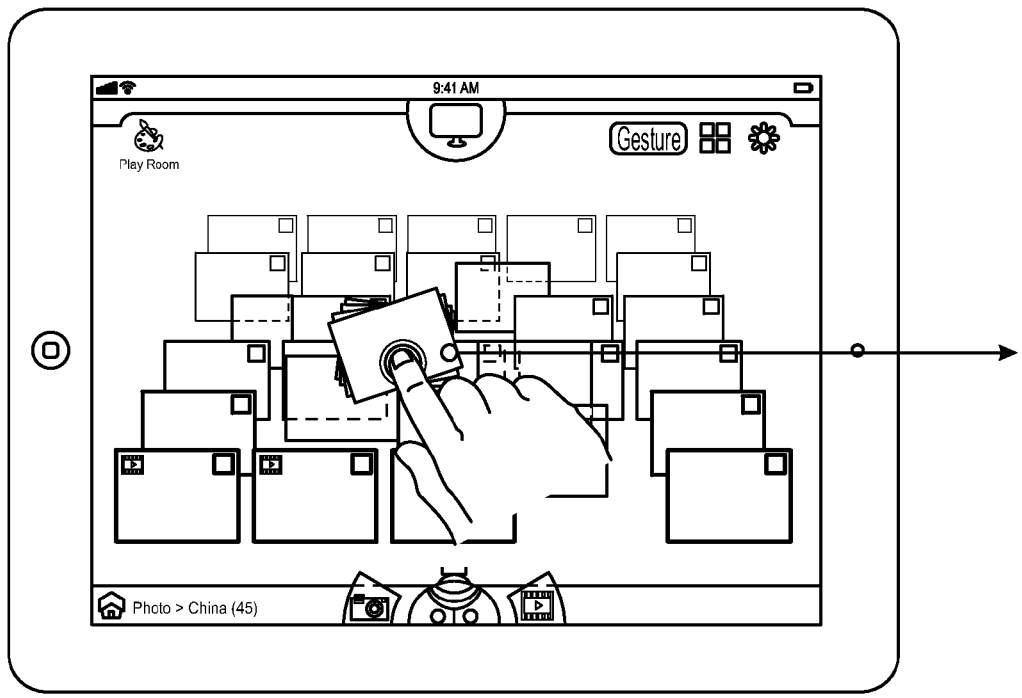
Figure 1Q:
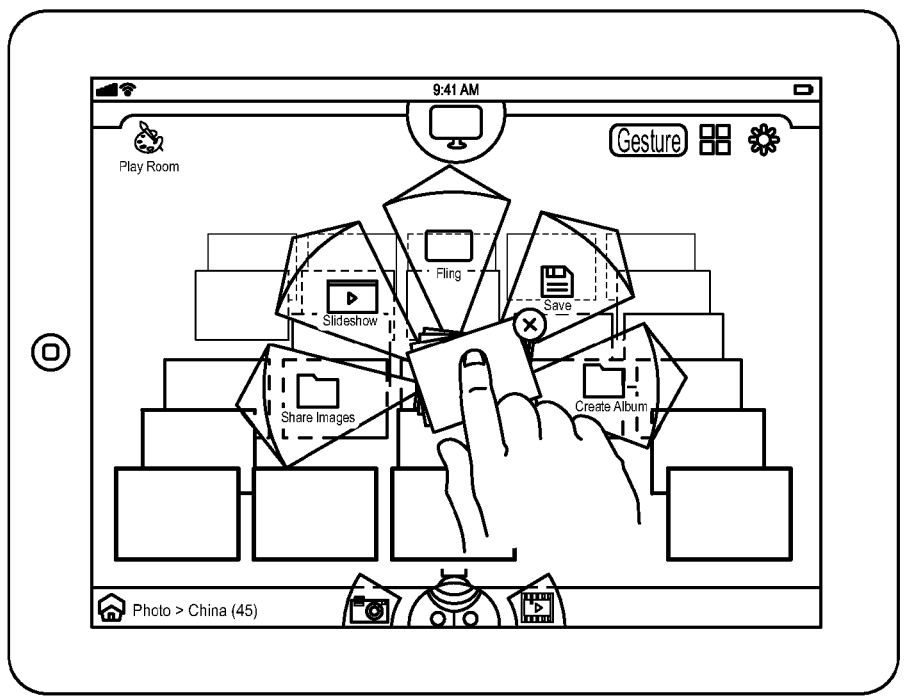
Figure 2:
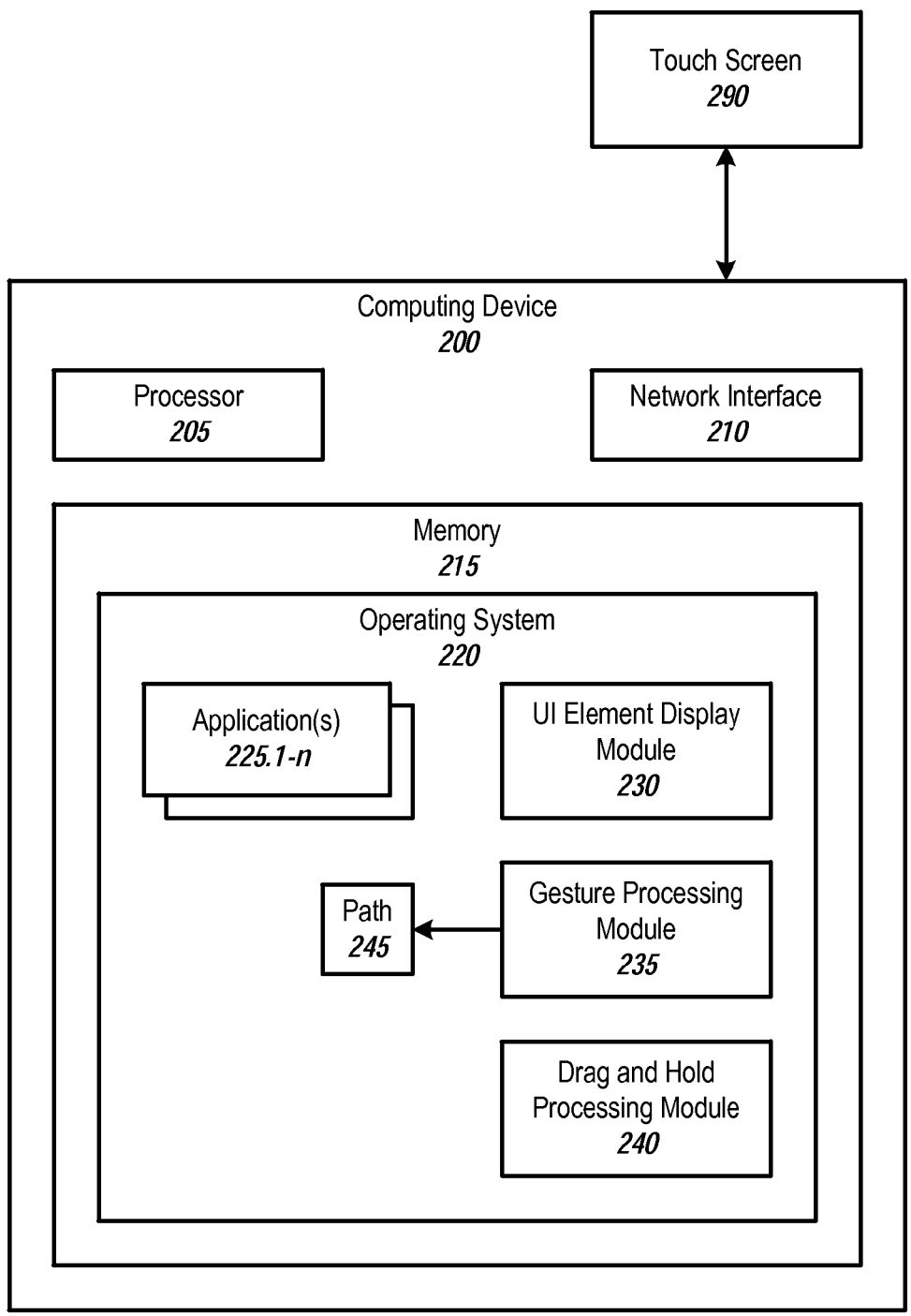

FIGS. 1A-1Q illustrates exemplary interfaces for managing plurality of user interface elements. Referring to FIG. 1A, the first gesture includes the user moving a finger in an arc across the touch screen from left to right while the finger is in contact (or near enough for the capacitive or other sensors to sense the finger) with the touch screen. The first gesture may begin at a first position corresponding to the collapsed view of the plurality of photos on the left side of screen shown in FIG. 1A and may continue toward a second position toward a right side of the screen shown in FIG. 1A. In response to the first gesture, the computing device stores, in a memory, a first path corresponding to the first gesture. The computing device may then display on the touch screen the plurality of user interface elements along the first path.

For example, as shown in FIG. 1B, in response to the user moving the finger in the arc across the touch screen of FIG. 1A, all or some of the photographs in the photo album may be spread out along the arc and displayed on the touch screen, representing a spread out view of the user interface elements. The distance between adjacent user interface elements in the arc may be the same for all adjacent user interface elements, having a predetermined distance between the adjacent user interface elements, which may be dependent on the number of user interface elements, and thus be independent of the finger speed. Alternatively, the distance between adjacent user interface elements in the arc may be determined based on a speed of the finger moving to create the arc across the touch screen. Adjacent user interface elements may be closer to one another in places where the finger moved faster. The first gesture may terminate proximate to (e.g., within a threshold distance, e.g., 0.5 cm, 1 cm, 1.5 cm, etc., of) an edge of the touch screen, and the user may hold the finger proximate to or at the edge of the touch screen (herein after referred to for simplicity merely as the edge of the screen) for a predetermined amount of time, causing the first path be extended across multiple (e.g., two, three, four, or more than four) screens and/or multiple arcs. The number of the multiple screens may be determined based on the amount of time for which the user held the finger at the edge. For example, if the user holds the finger at the edge for 1 second, the number of the multiple screens may be 2, if the user holds the finger at the edge for 2 seconds, the number of the multiple screens may be 3, if the user holds the finger at the edge for t seconds, the number of the multiple screens may be t+1, etc. A visual indication of the number of screens (e.g., flashing to a new screen or showing a number of screens at a corner of the touch screen) may be provided. Alternatively, after extending proximate to the edge of each screen, the user may add an additional screen by holding the finger at that position for a predetermined amount of time, which may change for each screen (e.g., is for the first screen, 1.5 s for the second screen, etc.). Accordingly, the plurality of user interface elements may be spread out across multiple screens. The flashed through number of screens may correspond to the number of the multiple screens through which the arc extends.

In addition to the first gesture, the computing device may react to a second gesture at positions overlaying the spread out user interface elements. The second gesture may have the same direction as the first gesture. For example, as shown in FIG. 1C, the second gesture may include user moving his/her finger along the spread out photographs from left to right. In response, the computing device increases amount of space between adjacent user interface elements. Increasing the amount of space between the adjacent user interface elements may result in a smaller number and/or smaller portion of each of user interface elements being displayed on the touch screen since the total amount of space occupied by the user interface elements may not change. For example, as shown in FIG. 1D, in response to the gesture of FIG. 1C, the amount of space between the photographs is increased and a smaller number of photographs than the number shown in FIG. 1C is displayed in FIG. 1D.

In a slightly different implementation, the second gesture may be in an opposite direction as the first gesture rather than being in the same direction as the first gesture. For example, as shown in FIG. 1E, the second gesture may include user moving his/her finger along the spread out photographs from right to left instead of from the left to right. In response to the second gesture, the computing device folds back the plurality of photographs to the original collapsed view shown in FIG. 1A. The user may be able to move the collapsed elements from one place to another by touching the collapsed elements and then dragging the collapsed elements across the screen and releasing. As a result, the user may have the ability to define both the starting point and the direction of the fan out/collapse.

In another implementation, the computing device may receive a Z form gesture across the touch screen as illustrated, for example, in FIG. 1G. The Z form gesture may be received when the photographs are collapsed on each other as shown in FIG. 1A or when they are spread out as shown in FIG. 1B. In response to the Z form gesture, the computing device displays on the touch screen some or all of the photographs in a grid pattern formation, as illustrated, for example, in FIG. 1H.

In another implementation, the computing device may receive an O form gesture after receiving the Z form gesture across the touch screen as illustrated, for example, in FIG. 1J-1 or FIG. 1J-2. The O form may be drawn in a clockwise direction as shown in FIG. 1J-2 or a counterclockwise direction as shown in FIG. 1J-1. In response to the O form gesture, the computing device returns the photographs to the original collapsed view from the grid pattern shown in FIG. 1H as shown in FIG. 1K.

Above are described the gestures of arc, line, path, Z form, and O form and the associated commands of spreading out along a path, collapsing, and creating a grid pattern view. In some examples, the command-gesture associations specified above are used. Alternatively, the user may be able to select which (of the above or additional) gestures are associated with which (of the above or additional) commands, for example, by accessing a "settings" application or menu in the computing device and entering the selected command-gesture associations in the "settings" application or menu. In some examples, the user may be able to define additional gesture(s) or command(s), for example, via the "settings" application or menu. One example interface for associating a gesture with a command may prompt the user to input a gesture and then prompt the user to input an associated command or set of commands. The commands may be written in code of a programming language, for example C or Java, or the commands may be selected from a list of commands displayed in the user interface.

The user may select from among the displayed user interface elements one or more of the user interface elements and move the user interface element along the touch screen. The selection may be performed using a finger or a stylus pen. In one implementation, the selected user interface element may be moved according to the movement of the finger in a drag-and-drop manner. This technique may be used, for example, to move the user interface element (e.g., photograph) into a new photo album or into a directory and is illustrated, for example, in FIG. 1L-1 or FIG. 1L-2.

In some cases, the first gesture may have a line shape instead of an arc shape. In response to the first gesture, therefore, the computing device may display some or all of the user interface elements in tiles along the line. For example, as shown in FIG. 1M, a user may make a gesture to cause N user interface elements (e.g., photographs of FIG. 1M) to be displayed in tiles on a line. The value of N may be determined based on a size of the photographs and based on a size of the touch screen. FIG. 1M also illustrates "pile 1" and "pile 2." Initially, all of the photographs are in "pile 1." The user moves a finger from left to right, from "pile 1" and along the line, to cause N photographs to be moved to the display in the tiles on the line. After the N photographs are displayed in the tiles on the line, the user may move the finger again from left to right, from "pile 1 along the line." In response, the photographs in the line may be moved to "pile 2" and N new photographs from "pile 1" may be moved onto the tiles on the line. As shown in FIG. 1N, when the user moves the finger from right to left, from "pile 2" and along the line, the photographs in the line are moved back to "pile 1" and N photographs from "pile 2" are, which were previously on the tiles on the line, placed on the tiles on the line. In some cases, the gestures may be animated, for example when the user moves the finger from left to right, photographs may be shown moving (e.g., flying across the screen) from "pile 1" to the line. In some cases, a user may wish to move fewer than N photographs. In these cases, the user may make a partial movement to move a smaller number of photographs. The number of photographs moved may depend on the size of the movement.

According to some implementations of the subject technology, a computing device displays, on a touch screen, multiple blocks, for example, as shown in FIG. 1P. Each block may represent a plurality of user interface elements and may be associated with a plurality of commands. The user may select one of the blocks using his/her finger and move the block from its original position to a termination position as shown in FIG. 1P. The termination position may correspond to any position on the touch screen other than the original position of the block. In response to holding the block on the termination position for more than a threshold amount of time (e.g., 1 second or 2 seconds), the computing device displays multiple commands adjacent to the first block, as shown in FIG. 1Q. The commands may include: "share images," "slideshow," "fling to external monitor," "save," and "create album." The user may select one of the displayed commands by dragging the first block into a position corresponding to the desired command and thereby cause the computing device to execute a corresponding command. The "fling to external monitor" command, when executed, may cause an image to be displayed on a monitor external to the computing device and connected to the computing device. For example, the computing device may be a mobile phone that is wirelessly connected to an external television monitor, and the "fling to external monitor" command may cause the image to be displayed at the television monitor.

The subject technology is described herein in conjunction with a finger being used to touch a touch screen. However, other mechanism such as, for example, a stylus, pen, nose, toe, may be used instead or in addition to the finger on a computing device having a touch screen. Alternatively, the subject technology may be implemented with a mouse operating on a non-touch display or with any other display and user input device.

FIG. 2 illustrates an exemplary computing device 200 for exploring and managing user interface elements on a touch screen of the computing device 200. The computing device may be a laptop computer, a desktop computer, a mobile phone, a tablet computer, a personal digital assistant (PDA), a digital music player, a smart watch, etc. As shown, the computing device 200 is coupled with a touch screen 290. The touch screen 290 is configured to display visual information and to receive touch input via a touching element (e.g., a finger or a stylus), which may be controlled by a user. The displayed visual information is generated by the computing device 200 and the received touch input is provided to the computing device 200 for processing via processor 205 of the computing device 200. The processor 205 is configured to execute instructions stored in a machine-readable medium such as, for example, the memory 215. While a single processor 205 is illustrated, the computing device 200 may include multiple processors 205.

The computing device 200 also includes a network interface 210. The network interface 210 includes an interface for transmitting and/or receiving data in a network such as, for example, the Internet, a local area network, a wide area network, a wired network, or a wireless network. The network interface 210 may include one or more network interface cards (NICs). The memory 215 includes data or instructions. As shown, the memory 215 stores an operating system 220, which includes application(s) 225.1-n, a user interface (UI) element display module 230, a gesture processing module 235, a drag and hold processing module 240, and a path 245.

The operating system 220 allows applications 225.1-n executing within the operating system 220 to access and interface with hardware resources accessible to the computing device 200, such as the processor 205, the network interface 210, and the touch screen 290. The applications 225.1-n may include any application(s), for example, a web browser, an email application, a text messaging application, a document processor, a gaming application, etc. One or more of the applications 225.1-n may access the UI element display module 230, the gesture processing module 235, or the drag and hold processing module 240 to display information or process user interaction with the displayed information.

The UI element display module 230, when executed, causes the processor 205 to display UI elements, for example, photographs, videos, audio files, icons for accessing applications, email messages, text messages, word processing documents, spreadsheets, slide shows, etc., via the touch screen 290. The UI elements may be displayed individually (e.g., individual photos displayed side-by-side) or in a single block representing multiple UI elements (e.g., a representation of a single photo album that includes multiple photos). In some examples, UI elements are initially presented in a single block. When the single block is selected, all or some of the UI elements within the block are presented individually. A single block may represent multiple UI elements when the UI elements are separated by the user into folders. For example, a user who took photographs in France, Mexico, and China may have photographs from France in a folder labeled "France," photographs from Mexico in a folder labeled "Mexico," and photographs from China in a folder labeled "China." The three folders may initially be represented as two blocks, with each block representing multiple UI elements. The user may select either the "France," the "Mexico" or the "China" folder to have the photograph in the selected folder displayed individually.

The gesture processing module 235 may be executed after the processor 205 displays on the touch screen 290 a block representing multiple UI elements after execution of the UI element display module 230. In executing the gesture processing module 235, the processor 205 receives via the touch screen 290 a first gesture at a position corresponding to the block representing the multiple user interface elements. The processor 205 stores, in the memory 215, the path 245 corresponding to the first gesture. The processor 205 displays, on the touch screen 290, at least a portion of the multiple UI elements in positions along the path 245. Operations of the processor 205 while executing the gesture processing module 235 are described in greater detail below, for example, in conjunction with FIG. 3.

The drag and hold processing module 240 may be executed after the processor 205 displays on the touch screen 290 multiple blocks including a first block after execution of the UI element display module 230. Each block represents multiple UI elements. For example, a block may correspond to a photo album, a collection of videos, a collection of text messages, etc. In executing the drag and hold processing module 240, the processor 205 receives, via the touch screen 290, an indication of dragging the first block by the user, followed by holding the first block by the user. The processor 205 displays, on the touch screen 290, in response to the dragging of the first block followed by the holding of the first block, multiple icons adjacent to the first block. Each icon in the multiple icons corresponds to a command. For example, if the UI elements are photographs, the icons may represent commands to "share photographs," "display slideshow," "fling to external monitor," "save," or "create album." Operations of the processor 205 while executing the drag and hold processing module 240 are described in greater detail below, for example, in conjunction with FIG. 4.

Figure 3:
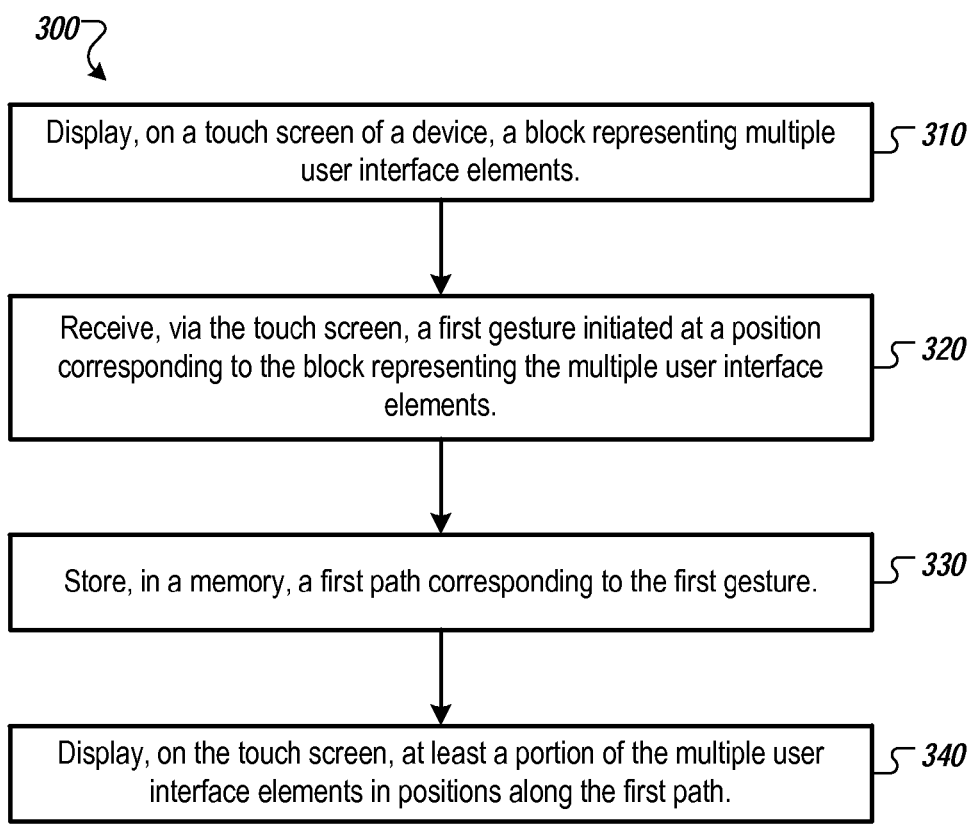
FIG. 3 illustrates an exemplary process for displaying user interface elements via a gesture.

FIG. 3 illustrates an exemplary process 300 for managing user interface elements via a gesture. The process 300 begins at step 310, where a computing device (e.g., computing device 200, implementing gesture processing module 235) displays on its touch screen (e.g., touch screen 290) a block representing a plurality of user interface elements. The user interface elements may be photographs and may be collapsed on top of each other, representing a collapsed view, for example, a photo album. Alternatively, the user interface elements may be videos, text files, text messages, emails, etc.

In step 320, the computing device receives, via the touch screen, a first gesture initiated at a position corresponding to the block representing the multiple user interface elements. For example, the user may place a touching device at the position corresponding to the block and make a gesture starting at the position. The gesture may be an arc, a line, or any other gesture. The touching device may be any touching device, for example, a finger or a stylus.

In step 330, the computing device stores, in a memory of the computing device, a first path (e.g., path 245) corresponding to the first gesture. The first path may include point(s) on the touch screen touched by the touching device during gesture of step 320. The point(s) may be connected with one another based on an interpolation, for example, a linear interpolation, a quadratic interpolation, a circular interpolation, etc. Storing the first path may include storing a trajectory of the first path, represented as a set of points on the first path. Each point in the set of points on the first path may be stored as an (x, y) coordinate representing a number of pixels of the point from a corner (e.g., a bottom left corner) of the touch screen, where x represents the number of pixels above the bottom edge, and y represents the number of pixels to the right of the left edge. Alternatively, a different corner (e.g., a top left corner) or a different unit of distance measurement (e.g., centimeters) may be used.

In step 340, the computing device displays and spreads out, on the touch screen, at least a portion of the multiple user interface elements in positions along the first path. The spread out user interface elements represent a spread out view. The first gesture, and therefore the first path, may terminate before reaching an edge of the touch screen. Alternatively, the first gesture may terminate at an edge of the touch screen and the computing device may flash through multiple screens while the touching device is at the edge. In response to the touching device being held at the edge, the first path may extend across multiple screen displays. For example, the computing device may flash through one screen during each predetermined period of time (e.g., 1 second, 2 seconds, etc.) and may extend the first path across an additional screen display after flashing through an additional screen.

The first path may be an arc, and the displayed user interface element(s) may be displayed in a fan along the arc as shown, for example, in FIG. 1B. The computing device may receive a second gesture, in the same direction as the first gesture, at positions overlaying the displayed user interface element(s). In response to the second gesture, the computing device may increase an amount of space between adjacent displayed user interface element(s). This is illustrated, for example, in the transition from FIG. 1C to FIG. 1D. The computing device may receive a third gesture, in the opposite direction from the first gesture, at positions overlaying the displayed user interface element(s). In response to the third gesture, the computing device may forego displaying the displayed user interface element(s) on the touch screen and display the block representing the multiple user interface elements. This is illustrated, for example, in the transition from FIG. 1E to FIG. 1F.

Alternatively, the computing device may receive a fourth gesture, the fourth gesture corresponding to a Z form drawn across the touch screen. In response to the fourth gesture, the computing device may display, on the touch screen, the multiple user interface elements in a grid pattern tile formation. This is illustrated, for example, in the transition from FIG. 1G to FIG. 1H. The computing device may receive a fifth gesture, the fifth gesture corresponding to an O form drawn across the touch screen. The O form may be drawn in either the clockwise or the counterclockwise direction, as shown in FIG. 1J-2 and FIG. 1J-1, respectively. In response to the fifth gesture, the computing device may forego displaying the displayed user interface element(s) on the touch screen and display the block representing the multiple user interface elements. This is illustrated, for example, in the transitions from FIG. 1H to FIGS. 1J-1/1J-2, and from FIGS. 1J-1/1J-2 to FIG. 1K.

The computing device may receive, via a touching device on the touch screen, a selection of a first user interface element from the displayed user interface element(s). After the selection of the first user interface element with the touching device, the computing device may receive an indication of a movement of the touching device across the touch screen. The computing device may move the first user interface element according to the movement of the touching device, as shown in FIGS. 1L-1 and 1L-2.

According to some implementations, the first path is a line, and the displayed user interface element(s) are displayed in tiles along the line as shown, for example, in FIGS. 1M and 1N. The computing device may receive a sixth gesture at positions overlaying the tiles along the line, the sixth gesture having the same direction as the first gesture. In response, the computing device may display, in the tiles along the line, new user interface element(s) from among the multiple user interface elements. At least one of the new user interface element(s) may be different from the previously displayed user interface element(s). For example, the multiple user interface elements may have an order and user interface elements numbered 1 . . . N in the order may be displayed in the line after the first gesture, while user interface elements N+1 . . . 2N may be displayed in the line after the sixth gesture, where N is the number of tiles on the line. When user interface elements N+1 . . . 2N are displayed, the computing device may receive a seventh gesture at positions overlaying the tiles along the line, the seventh gesture having the opposite direction from the first gesture. In response, the user interface elements 1 . . . N may be displayed in the tiles along the line.

According to some examples, while a certain set of user interface element(s) kN+1 . . . (k+1)N, where k is a positive integer, is displayed in the tiles on the line, a representation of user interface element(s) in the order after the displayed user interface element(s), elements (k+1)N+1 ... M, may be presented at "pile 1" (of FIGS. 1M and 1N) adjacent to the left end of the line, where M is the number of user interface elements in the multiple user interface elements. A representation of the user interface element(s) in the order after the displayed user interface element(s), elements 1 ... kN, may be presented at "pile 2" (of FIGS. 1M and 1N) adjacent to the right end of the line.

According to some implementations, a computing device may receive a request to view photographs of a particular person. The computing device may identify, using facial recognition technology, photographs of the particular person from the plurality of photographs. The computing device may spread out, in response to the requests to view the photographs of the particular person, on the touch screen and along the first path, the photographs of the particular person from the plurality of photographs. For example, the computing device may include an application that stores names of persons in association with the faces of the persons. With appropriate permissions, the name-face association may be received from an external social networking service (e.g., Facebook® or Google Plus®) or may be determined based on facial tagging of photographs stored locally at the computing device. The application may receive, from a user, a selection of a person from a list of persons tagged in the photographs accessible to the application. For example, the person may request to see photographs of "John Johnson." In response, the application may display photographs that are facially tagged to include "John Johnson" or photographs on the computing device that are predicted, using facial recognition, to include "John Johnson."

Figure 4:
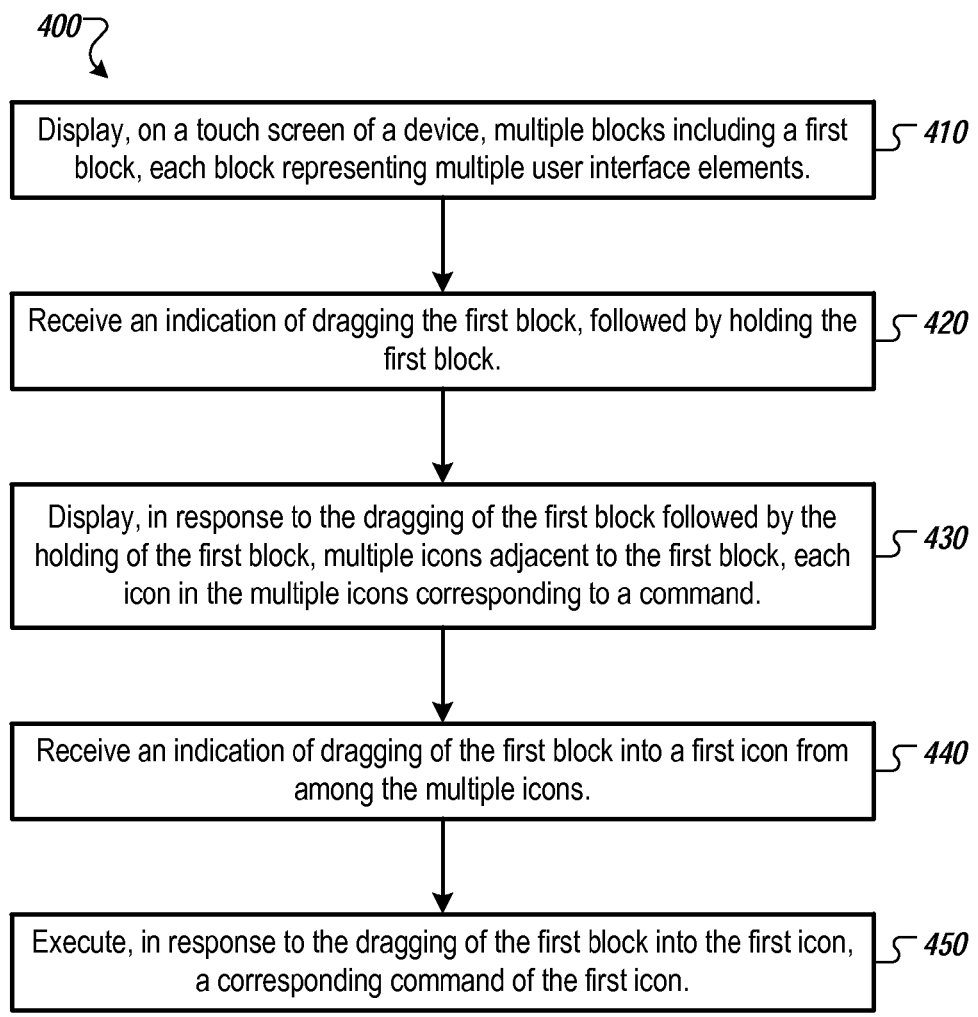
FIG. 4 illustrates an exemplary process for displaying user interface elements via a drag-and-hold.

FIG. 4 illustrates an exemplary process 400 for managing user interface elements via a drag-and-hold. The process 400 begins at step 410, where a computing device (e.g., computing device 200, implementing drag and hold processing module 240) displays, on a touch screen (e.g., touch screen 290) of the device, multiple blocks, including a first block. Each block represents multiple user interface elements. For example, the user interface elements may be photographs and each block may represent a photo album.

In step 420, the computing device receives an indication of dragging of the first block, followed by holding the first block. For example, as shown in FIGS. 1P and 1Q, one of the blocks is dragged out of its original position and held, using a finger, in a new position. Alternatively, the dragging and holding may be completed with another touching device, for instance, a stylus. In some examples, each block may be controlled separately. Alternatively, two or more blocks may be linked and may be controlled together. The user may indicate, for example, in a "settings" menu or application, that two or more blocks are to be linked as he/she often wishes to access them together. For example, a user who took photographs in Spain and Portugal during the same trip may have two photograph folders called "Spain" and "Portugal." The user may indicate that he/she wishes to link the two folders and control them together, as they are from the same trip. When one linked block (e.g., the "Spain" folder) is expanded or collapsed, the other linked block(s) (e.g., the "Portugal" block) are also automatically expanded or collapsed.

In step 430, the computing device displays, at the touch screen, in response to the dragging of the first block followed by the holding of the first block, multiple icons adjacent to the first block. Each icon in the multiple icons corresponds to a command. For example, as shown in FIG. 1Q, the commands may include the following: "share images," "slideshow," "fling," "save," and "create album."

In step 440, the computing device receives an indication of dragging of the first block into a first icon from among the multiple icons. For example, the user may desire to execute the "share images" command and may use the finger to drag the first block into the icon for the "share images" command. Alternatively, the user may desire to execute another command represented by another icon.

In step 450, the computing device executes, in response to the dragging of the first block into the first icon, a corresponding command of the first icon. For example, the computing device may execute the "share images" command. After step 450, the process 400 ends.

Figure 5:
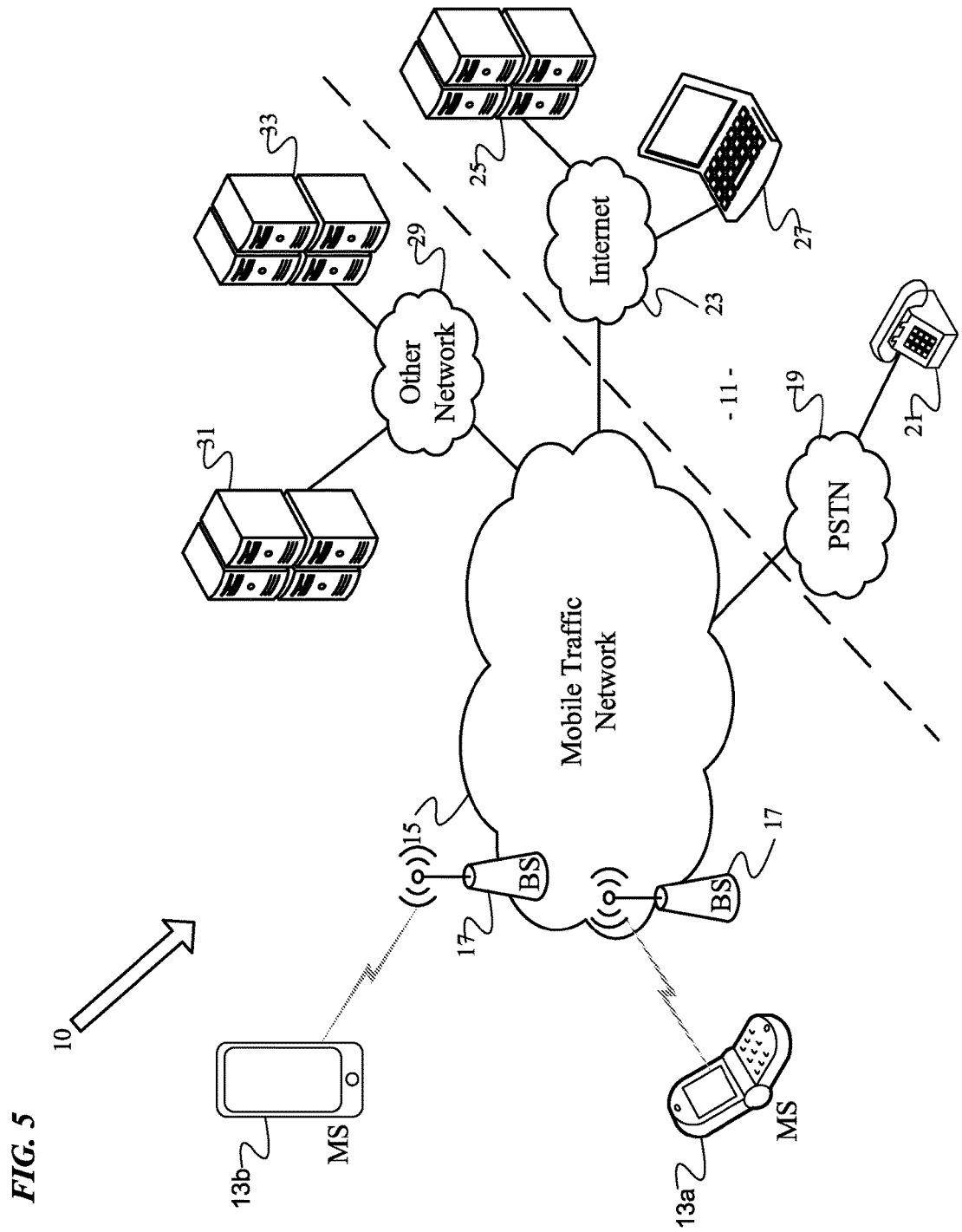
FIG. 5 is a high-level functional block diagram of an example of a system of networks/devices that provide various communications for mobile stations and support an example of the managing user interface elements using gestures service.

FIG. 5 illustrates a system 10 offering a variety of mobile communication services, including communications for managing user interface elements using gestures by mobile station users. The example shows simply two mobile stations (MSs) 13a and 13b as well as a mobile communication network 15. The stations 13a and 13b are examples of mobile stations that may be used for the managing user interface elements using gestures service. For example, the mobile stations 13a or 13b may correspond to the computing device 200 of FIG. 2. However, the network will provide similar communications for many other similar users as well as for mobile devices/users that do not participate in the managing user interface elements using gestures service. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may are capable of voice telephone communications through the network 15, the exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks. The mobile stations 13a and 13 of users of the managing user interface elements using gestures service also can receive and execute applications written in various programming languages, as discussed more later.

Mobile stations 13 can take the form of portable handsets, smart-phones or personal digital assistants, although they may be implemented in other form factors. Program applications, including an application to assist in the managing user interface elements using gestures service and/or any an application purchased via an on-line service can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BS s) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13 communicates over the air with a base station 17 and through the traffic network 15 for various voice and data communications, e.g. through the Internet 23 with a server 25 and/or with application servers 31. If the mobile service carrier offers the managing user interface elements using gestures service, the service may be hosted on a carrier operated application server 31, for communication via the networks 15 and 29. Alternatively, the managing user interface elements using gestures service may be provided by a separate entity (alone or through agreements with the carrier), in which case, the service may be hosted on an application server such as server 25 connected for communication via the networks 15 and 23. Server such as 25 and 31 may provide any of a variety of common application or service functions in support of or in addition to an application program running on the mobile station 13. However, for purposes of further discussion, we will focus on functions thereof in support of the mobile managing user interface elements using gestures service. For a given service, including the managing user interface elements using gestures service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10. A similar authentication function may be provided for managing user interface elements using gestures service(s) offered via the server 25, either by the server 33 if there is an appropriate arrangement between the carrier and the operator of server 24, by a program on the server 25 or via a separate authentication server (not shown) connected to the Internet 23.

The enhanced managing user interface elements using gestures service under consideration here may be delivered to touch screen type mobile stations as well as to non-touch type mobile stations. Hence, our simple example shows the mobile station (MS) 13*a* as a non-touch type mobile station and shows the mobile station (MS) 13 as a touch screen type mobile station. Implementation of the on-line managing user interface elements using gestures service will involve at least some execution of programming in the mobile stations as well as implementation of user input/output functions and data communications through the network 15, from the mobile stations.

Those skilled in the art presumably are familiar with the structure, programming and operations of the various types of mobile stations. However, for completeness, it may be useful to consider the functional elements/aspects of two exemplary mobile stations 13*a* and 13*b*, at a high-level.

Figure 6:
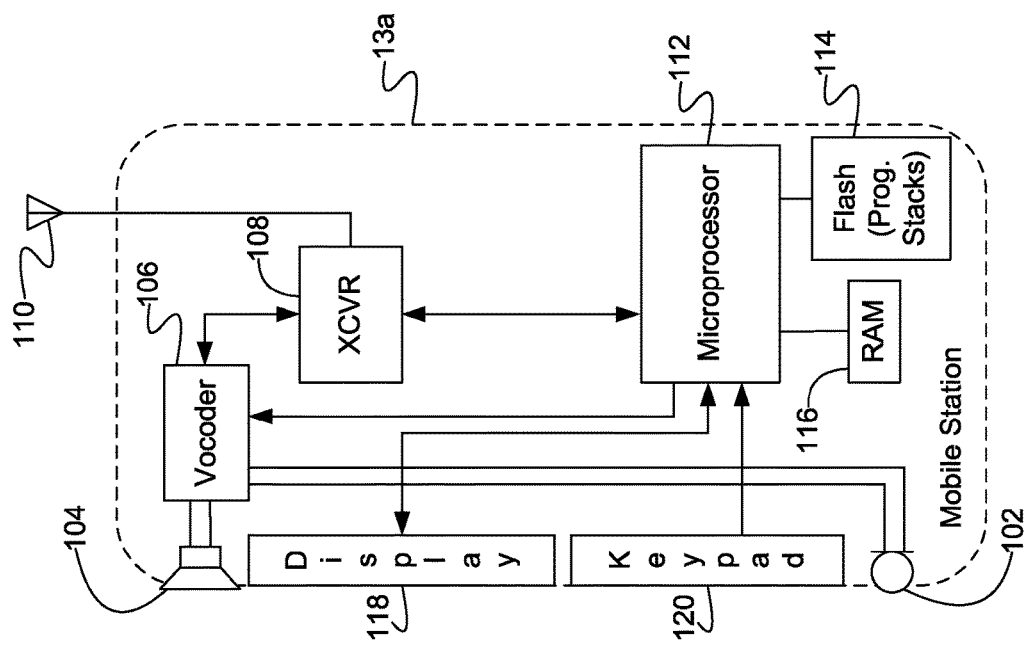
FIG. 6 is a high-level functional block diagram of an exemplary non-touch type mobile station as may utilize the managing user interface elements using gestures service through a network/system like that shown in FIG. 5.

For purposes of such a discussion, FIG. 6 provides a block diagram illustration of an exemplary non-touch type mobile station 13a. Although the mobile station 13a may be a smart-phone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass embodiments of the mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13a includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during managing user interface elements using gestures.

A microprocessor 112 serves as a programmable controller for the mobile station 13a, in that it controls all operations of the mobile station 13a in accord with programming that it executes, for all normal operations, and for operations involved in the managing user interface elements using gestures procedure under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13a includes a processor, and programming stored in the flash memory 114 configures the processor so that the mobile station is capable of performing various desired functions, including in this case the functions involved in the technique for providing managing user interface elements using gestures.

Figure 7:
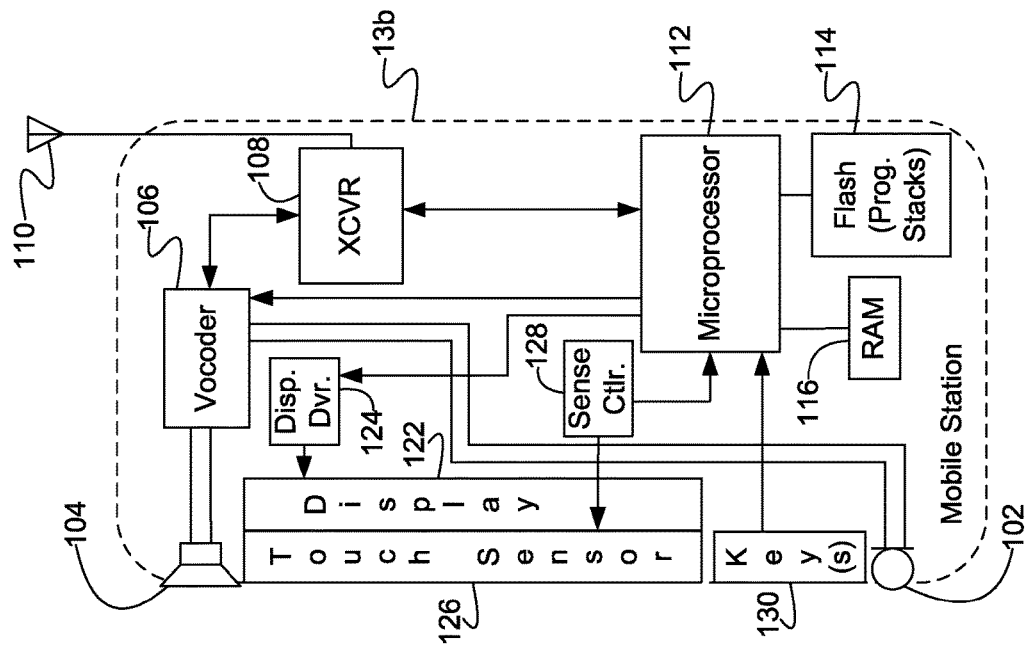
FIG. 7 is a high-level functional block diagram of an exemplary touch screen type mobile station as may utilize the managing user interface elements using gestures service through a network/system like that shown in FIG. 5.

For purposes of such a discussion, FIG. 3 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 7. For example, the touch screen type mobile station 13b includes a microphone 102, speaker 104 and vocoder 106, for audio input and output functions, much like in the earlier example. The mobile station 13b also includes at least one digital transceiver (XCVR) 108, for digital wireless communications, although the handset 13b may include an additional digital or analog transceiver. The concepts discussed here encompass embodiments of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13b, in that it controls all operations of the mobile station 13b in accord with programming that it executes, for all normal operations, and for operations involved in the managing user interface elements using gestures procedure under consideration here. In the example, the mobile station 13b includes flash type program memory 114, for storage of various program routines and mobile configuration settings.

The mobile station 13b may also include a non-volatile random access memory (RAM) 116 for a working data processing memory. Of course, other storage devices or configurations may be added to or substituted for those in the example. Hence, outlined above, the mobile station 13b includes a processor, and programming stored in the flash memory 114 configures the processor so that the mobile station is capable of performing various desired functions, including in this case the functions involved in the technique for providing managing user interface elements using gestures.

In the example of FIG. 6, the user interface elements included a display and a keypad. The mobile station 13b may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver 124, to present visible outputs to the device user. The mobile station 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13b. The microphone 102 and speaker 104 may be used as additional user interface elements, for audio input and output, including with respect to some managing user interface elements using gestures related functions. The gestures related functions may include single touch gestures or multi-touch gestures. The multi-touch gestures may include, for example, moving fingers closer toward one another, moving fingers away from one another, moving multiple fingers in a related motion (e.g., moving an index finger to the left and a thumb to the right in a doorknob-turning-like fashion) etc.

Multi-touch gesture usage may include, but is not limited to, the following scenarios. The user may use a two finger pinch gesture to zoom in and out on an item(s). The user may use one finger to select an item, and two fingers to drag an item. The user may use a three finger tap to change the view mode. A one finger fling may move an item to the slide show list, while a two finger fling may move an item to a folder. A one finger drag gesture may move the top item of a pile, while a two finger drag gesture may move the entire pile of items. A one finger "Z" gesture may switch to one view mode, while a two finger gesture may switch to another view mode. A two finger doorknob turn on a picture may rotate the picture's orientation. Other multi-touch gesture usages may also be implemented in conjunction with the subject technology.

The structure and operation of the mobile stations 13a and 13b, as outlined above, were described to by way of example, only.

As shown by the above discussion, functions relating to the an enhanced managing user interface elements using gestures experience, via a graphical user interface of a mobile station may be implemented on computers connected for data communication via the components of a packet data network, as shown in FIG. 5. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the managing user interface elements using gestures. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for managing user interface elements using gestures, in essentially the manner performed in the implementations discussed and illustrated herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a nonexclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    displaying a block, the block representing a plurality of related user interface elements that are stored together, wherein the plurality of related user interface elements comprise image-related data;
    receiving an indication of execution of a drag-and-hold process comprising dragging the block to a termination position followed by holding the block on the termination position for more than a threshold amount of time; and
    displaying, in response to receiving the indication of execution of a drag-and-hold process, a plurality of icons adjacent to the block, each icon in the plurality of icons corresponding to a command for interfacing with the plurality of user interface elements represented by the block.

2. The method of claim 1, further comprising:
    receiving an indication of dragging the block into a first icon from among the plurality of icons; and
    executing, in response to the dragging of the block into the first icon, a command corresponding to the first icon.

3. The method of claim 2, wherein the user interface elements are photographs, wherein the plurality of related user interface elements comprises a folder of photographs, and wherein the command corresponding to the first icon comprises one or more of "share photographs," "display slideshow," "fling to external monitor," "save," or "create album".

4. The method of claim 2, wherein the command corresponding to the first icon comprises "fling to external monitor," and wherein executing fling to external monitor comprises causing a display of an image on a display monitor coupled to the device.

5. The method of claim 2, wherein the indication of dragging the block into the first icon is received after the indication of the execution of the drag-and-hold process is received.

6. The method of claim 1, wherein the user interface elements are photographs, wherein the plurality of related user interface elements comprises a folder of photographs, and wherein the command corresponding to each of the plurality of icons comprises one or more of "share photographs," "display slideshow," "fling to external monitor," "save," or "create album".

7. The method of claim 1, wherein the method is performed by a device having a touch screen.

8. The method of claim 1, wherein the commands corresponding to at least a portion of the plurality of icons are related to functions specific to the image-related data.

9. A method, comprising:
    displaying a block, wherein the block represents a plurality of stored user interface elements, the stored user interface elements being stored together in a computer-readable medium, and each of the stored user interface elements comprises image-related data;
    receiving an indication of a dragging then holding of the block, wherein receiving the indication of the dragging then holding of the block comprises receiving an indication of dragging the block to a termination position followed by holding the block on the termination position for more than a threshold amount of time; and
    displaying, in response to receiving the indication of the dragging then holding of the block, a plurality of icons adjacent the block.

10. The method of claim 9, wherein each icon in the plurality of icons corresponds to a command for interfacing with the plurality of stored user interface elements represented by the block.

11. The method of claim 9, wherein the stored user interface elements are stored photographs, and wherein the command corresponding to the specific icon comprises at least one command from among "share photographs," "display slideshow," "fling to external monitor," "save," and "create album".

12. The method of claim 9, wherein the block is a first block, wherein displaying the block comprises displaying a plurality of blocks, including the first block and a second block, wherein the method further comprises:
    receiving a link indication and, in response, setting the first block and the second block as linked blocks; and
    upon expanding or collapsing any among the linked blocks, automatically expanding or collapsing the other of the linked blocks.

13. The method of claim 9, wherein each icon in the plurality of icons corresponds to a command for interfacing with the plurality of stored user interface elements represented by the block, wherein the stored user interface elements include stored photographs, and wherein the commands corresponding to the plurality of icons comprise at least one command from among "share photographs," "display slideshow," "fling to external monitor," "save," and "create album".

14. The method of claim 13, wherein the block is a first block, wherein the stored photographs are stored in a first folder, wherein displaying the block comprises displaying a plurality of blocks, including the first block and a second block, the second block representing photographs stored in a second folder, wherein the method further comprises:

receiving a link indication and, in response, linking the first folder and the second folder and setting the first block and the second block as linked blocks; and upon expanding or collapsing any among the linked blocks, automatically expanding or collapsing the other of the linked blocks.

15. The method of claim 9, the method further comprising:

receiving an indication of dragging of the block into a specific icon among the plurality of icons; and executing, in response to receiving the indication of dragging of the block into the specific icon, a command corresponding to the specific icon.

16. A non-transitory computer-readable medium storing instructions which, when executed by a computer, cause the computer to:

display, a block, wherein the block represents a plurality of stored user interface elements, the stored user interface elements being stored together in a computer-readable medium, and each of the plurality of stored user interface elements comprises image-related data;

receive an indication of a dragging then holding of the block, wherein receiving the indication of the dragging then holding of the block comprises receiving an indication of dragging the block to a termination position followed by holding the block on the termination position for more than a threshold amount of time; and display, in response to the indication of the dragging followed by holding of the block, a plurality of icons adjacent the block.

17. The non-transitory computer-readable medium of claim 16, wherein the stored user interface elements include stored photographs, and wherein the command corresponding to the specific icon comprises at least one command from among "share photographs," "display slideshow," "fling to external monitor," "save," and "create album".

18. The non-transitory computer-readable medium of claim 16, wherein each icon in the plurality of icons corresponds to a command for interfacing with the plurality of stored user interface elements represented by the block.

19. The non-transitory computer-readable medium of claim 16, wherein the instructions further cause the computer to:

receive an indication of dragging of the block into a specific icon among the plurality of icons; and execute, in response to receiving the indication of dragging of the block into the specific icon, a command corresponding to the specific icon.

* * * * *